United States Patent
Powell

(10) Patent No.: US 7,739,256 B2
(45) Date of Patent: Jun. 15, 2010

(54) METHOD FOR SELLING CUSTOM BUSINESS SOFTWARE AND SOFTWARE EXCHANGE MARKETPLACE

(76) Inventor: Norman Powell, 2835 Canterbury La., Columbus, OH (US) 43221

( * ) Notice: Subject to any disclaimer, the term of this patent is extended or adjusted under 35 U.S.C. 154(b) by 395 days.

(21) Appl. No.: 11/635,236

(22) Filed: Dec. 7, 2006

(65) Prior Publication Data

US 2008/0140537 A1 Jun. 12, 2008

(51) Int. Cl.
*G06F 7/00* (2006.01)
*G06F 17/30* (2006.01)
(52) U.S. Cl. .................... 707/705; 707/944; 705/26
(58) Field of Classification Search ............. 705/26, 705/7, 14; 717/152, 138, 130, 124, 126; 707/705, 944
See application file for complete search history.

(56) References Cited

U.S. PATENT DOCUMENTS

| | | | |
|---|---|---|---|
| 5,970,475 A | 10/1999 | Barnes et al. | |
| 6,598,221 B1 * | 7/2003 | Pegatoquet et al. | ......... 717/152 |
| 6,850,900 B1 * | 2/2005 | Hare et al. | ..................... 705/26 |
| 7,016,866 B1 | 3/2006 | Chin et al. | |
| 7,099,836 B2 | 8/2006 | Cichanowicz | |
| 7,234,133 B2 * | 6/2007 | Klein | .......................... 717/130 |
| 7,363,246 B1 * | 4/2008 | Van Horn et al. | ............. 705/26 |
| 2002/0147969 A1 * | 10/2002 | Lethin et al. | ................. 717/138 |
| 2003/0182653 A1 * | 9/2003 | Desoli et al. | ................. 717/138 |
| 2004/0107125 A1 * | 6/2004 | Guheen et al. | .................. 705/7 |
| 2005/0015758 A1 * | 1/2005 | North | ......................... 717/138 |
| 2006/0010429 A1 * | 1/2006 | Ihara | ......................... 717/126 |
| 2006/0085285 A1 | 4/2006 | Cichanowicz | |
| 2006/0123394 A1 * | 6/2006 | Nickell et al. | ............... 717/124 |
| 2007/0083433 A1 * | 4/2007 | Lawe | ......................... 705/14 |

* cited by examiner

*Primary Examiner*—John E Breene
*Assistant Examiner*—Giovanna Colan
(74) *Attorney, Agent, or Firm*—Gallagher & Dawsey Co., LPA; Michael J. Gallagher; David J. Dawsey

(57) ABSTRACT

A method of selling custom business software and a software exchange marketplace enables a software seller to offer a custom software application for sale. The method includes receiving the custom software application from the software seller. The marketplace includes a qualified application inventory and a custom software application submission log. A prospective software buyer may search the qualified software application inventory. The method includes associating the custom application with the custom software application submission log. The method identifies deficiencies with a software source code by comparing the software source code to a source code qualification standard. The method identifies deficiencies with a plurality of software documents by comparing them to a document qualification standard. The method compares the submission log with a final review standard. The method qualifies the software source code and software documents before listing them in the qualified software application inventory.

22 Claims, 14 Drawing Sheets

METHOD FOR SELLING CUSTOM BUSINESS SOFTWARE AND SOFTWARE EXCHANGE MARKETPLACE

TECHNICAL FIELD

The instant invention relates to a method for selling custom business software and a software exchange marketplace, and, more particularly, relates to a software exchange marketplace which appraises and qualifies a custom software application submitted by a software seller before listing and offering a qualified software application for sale to at least one prospective software buyer.

BACKGROUND OF THE INVENTION

To improve their operating efficiencies many companies and other business entities are implementing business software. Some types of business software are designed to integrate a plurality of legacy, stand-alone systems, such as a payroll department system, a human resource system, a warehouse system, and an accounting department system, into a single, unified software system. By integrating separate computer systems into the single system, the various departments share information through a single database. Thus, barriers to a free exchange of information between departments are removed. For example, in the legacy systems, personnel may shuffle a customer order from one department to another with each department entering the information that it needs from the order into its own system. Thus, no one in the company knows the status of the order at any particular time without contacting other departments. By contrast, in the single, unified system, all departments have access to each other's information, that way each department has access to all information that is necessary to determine the status of the order. Hopefully, as a result, the customer receives their order more quickly. Large companies pose the greatest implementation challenges.

In general, large companies have more bureaucracy and may have multiple stand-alone systems possibly located at different geographic locations. In addition, many businesses believe that their method of operation gives them a business advantage. Thus a custom business software application is often required to address multiple, and sometime duplicative, stand-alone systems in a large corporation, as well as the business' individual method of operation. An IT professional's skills may be required to install and integrate business software, but they are necessary for customizing business software. Consequently, the costs of purchasing and implementing custom business software can be prohibitive due to the complexity of large company systems and the high-level skills required for integration and customization.

As is known in the art, integration of stand-alone computer systems may be accomplished by implementation of an Enterprise Resource Planning (ERP) system. ERP systems are a type of business software that integrates multiple, stand-alone systems into a single system. In other words, ERP systems target the elimination of the barriers to communication between the legacy stand-alone systems. The benefits of an integrated system may include reduced operating costs and standardization in reporting financial data, such as for Sarbanes-Oxley compliance. Another benefit may include lower system maintenance costs. Commercially available ERP systems include systems such as those available from Oracle, SAP, and Microsoft.

As previously mentioned, implementation of an ERP system may entail installation, integration, and customization by IT professionals. Ideally, the IT professional will simply install a "vanilla" or standard off-the-shelf version of the ERP software. Off-the-shelf versions of ERP software usually incorporate "best practices" as interpreted by the ERP software producer. The ERP software does not, therefore, incorporate each individual's best practices. Of course, the reality of implementing ERP software is not so simple. One reason is because off-the-shelf ERP software does not implement what a company considers as its best business practices. In these situations, ERP implementation will require the IT professionals to customize the ERP system. The IT professionals customize ERP systems to accomplish various tasks, for example, by writing new user interfaces and modifying the underlying application code to perform a customized function. Another reason to customize is to interface the ERP system to other third party applications. Customizing an ERP system is both expensive and time consuming.

In an effort to make their products more user friendly and affordable, business software companies have introduced add-on modules that are more easily integrated into a core ERP system, for example, SAP America Inc., Newtown Square, Pa., (hereinafter, "SAP") offers a variety of modules, such as a customer relationship management (CRM) module, a product lifecycle management (PLM) module, a supply chain management (SCM) module, and a supplier relationship management (SRM) module. While the availability of modules simplifies, to some extent, the implementation of the module, customization is still the mainstay for conforming the ERP system to what a company considers as its best practices. Therefore, the costs of implementing ERP software, which usually requires some customization, remains high, and may easily exceed the cost of the software license. Thus, many companies, which would benefit from implementation of an ERP system, cannot afford to buy and implement the ERP system. Other companies do not purchase ERP systems because an analysis of return on investment indicates that ERP has a poor return.

Therefore, what is needed in the art is a method for selling customized business software. If a company which customizes its ERP system can sell its customized software, it will recapture some of its costs, thereby improving its return on investment. In addition, those companies who cannot justify buying and implementing a vanilla version of ERP software because of its cost, may, however, have sufficient money to purchase a customized software application that meets their needs. For example, companies with similar business models, i.e., alcoholic beverage and soda beverage manufacturers, who are not direct competitors, may have similar customization needs for their ERP software. Therefore, if the alcoholic beverage manufacturer customizes its ERP software, it may sell it to the soda beverage manufacturer to recoup some of its ERP implementation costs. The soda beverage manufacturer has an opportunity to purchase otherwise unavailable, customized ERP software. While the customized ERP software may be a 90% fit to the soda beverage manufacturer's systems, the overall cost of purchasing and implementing the customized ERP software may be substantially less than purchasing off-the-shelf software and then customizing it. Thus, by buying an already customized software system, the buyer saves substantial development costs and lowers the overall cost of its investment. In other words, both the software seller and software buyer save money.

SUMMARY OF INVENTION

In its most general configuration, the present invention advances the state of the art with a variety of new capabilities and overcomes many of the shortcomings of prior methods and systems in new and novel ways. In its most general sense, the present invention overcomes the shortcomings and limitations of the prior art in any of a number of generally effective configurations. The instant invention demonstrates such capabilities and overcomes many of the shortcomings of prior methods in new and novel ways.

A method of selling custom business software incorporates a software exchange marketplace. In one embodiment, the software exchange marketplace provides at least one software seller with an opportunity to sell a custom means for computer analysis, such as, a custom software application, to at least one prospective software buyer.

In an embodiment of the invention, the method of selling custom business software includes of the following steps. The software seller submits the custom software application to the marketplace. The custom software application may have a means for performing computer analysis and a means for documenting computer analysis. In one embodiment, the performing computer analysis means is a software source code and the documenting computer analysis means is a plurality of software documents. The marketplace then associates a means for recording deficiencies, such as a custom software application submission log, with the custom software application. The marketplace then appraises the custom software application to determine whether the custom software application has commercial value. If the marketplace determines that the custom software application has commercial value, the marketplace qualifies the custom software application. The marketplace then lists a qualified means for computer analysis, which in one embodiment, is a qualified software application, for sale in a means for recording deficiencies, such as a qualified software application inventory. The marketplace authorizes the prospective software buyer to search the qualified software application inventory for a qualified software application.

The qualified software application inventory contains qualified software applications searchable by both software sellers and prospective software buyers. A first step may include a presubmission search by the software seller of the qualified software application inventory.

In an embodiment of the instant invention, the method of selling custom business software begins after the software seller submits the custom software application to the marketplace. Therefore, following submission of the custom software application, the marketplace appraises the custom software application. In a first step of an appraisal process, the marketplace assigns the custom software application submission log to the custom software application.

Once the custom software application submission log is assigned, subsequent appraisal steps may record deficiencies or other problems identified with the custom software application in the custom software application submission log. During the appraisal step, the marketplace may determine whether the custom software application has commercial value and what resources, if any, will be required to transform the custom software application into the qualified software application. Unless noted otherwise, the following appraisal steps may proceed simultaneously and the process may not be serial, as described herein.

In another step following submission of the custom software application, the marketplace may search the qualified software application inventory to determine if any of the qualified software applications present are similar to the custom software application. A search result is recorded in the custom software application submission log.

In another embodiment of the instant invention, the method further includes a step of importing the software source code into a means for receiving and storing, such as a platform specific development system. When the marketplace imports the software source code into the platform specific development system, the marketplace may record any problems or issues associated with importation process as at least one importation result.

In another embodiment of the instant invention, the marketplace has at least one standard. The marketplace uses the standard to appraise the commercial value of the custom software application. The standard may also establish a level of quality for the qualified software applications that are listed in the qualified application inventory. In one embodiment, the standard is a means for standardizing software code, such as a source code qualification standard having a program organizational component. The marketplace records any organizational errors or potential logic problems with the software source code as at least one software code deficiency in the custom software application submission log.

In another embodiment, the marketplace may create a test script to test the software source code. The source code qualification standard may be, for example, a means for standardizing software code execution. In one embodiment, the standardizing software code execution means is a program execution component. The program execution component is compared to an execution result of the software source code with the test script. Any deficiencies identified during the comparison may be recorded in the custom software application submission log as at least one software execution deficiency. The marketplace may compare the software documents with a means for standardizing software documents, which in one embodiment is a document qualification standard. Issues with the software documents are recorded in the custom software application submission log as at least one document deficiency.

In one embodiment of the instant invention, the marketplace may reject the custom software application or request for more information from the software seller at any time. In another embodiment, the method of selling has predetermined steps for determining whether to reject the custom software application. Once the marketplace has compared the custom software application with the source code qualification standard and the document qualification standard, and the marketplace records any deficiencies in the custom software application submission log, the marketplace may reject the custom software application, request more information from the software seller, or continue with the appraisal.

In one embodiment, the method of selling custom business software includes a step for comparing the custom software application submission log with a means for identifying commercially valuable custom software applications, such as a final review standard. During this step, the marketplace determines whether the custom software application satisfies the final review standard. If the final review standard is satisfied, then the marketplace may accept the custom software application. After the marketplace accepts the custom software application, qualification may begin by renaming the software source code according to a standard naming convention.

In another embodiment of the instant invention, upon acceptance, the marketplace may assign a software broker to the custom software application. The software broker may be a professional who is tasked with the responsibility of managing the custom software application through the qualification and listing processes, as well as marketing the qualified software application to the prospective software buyers.

The marketplace qualifies the software source code by transforming it into a qualified means for performing computer analysis, such as a qualified source code. During qualification, at least one of the software code deficiencies or at least one of the software execution deficiencies, or both, are corrected so that the source code qualification standard is satisfied. The marketplace transforms the software source code into the qualified source code by correcting at least one of the deficiencies.

During qualification, the marketplace also qualifies the documenting computer analysis means to transform them into a qualified means for documenting computer analysis, such as a qualified software document. The marketplace corrects at least one of the document deficiencies recorded in the custom software application submission log during the appraisal process. Once the software documents satisfy the document qualification standard, the software documents become qualified software documents.

In yet another embodiment of the instant invention, the method includes developing, associating, and executing a test case with the qualified source code. The test case includes a set of variables and it interacts with the qualified source code. The test case may be written to be applicable to as many prospective software buyers as possible. The marketplace may provide the prospective software buyer with access to the test case and the authority to execute it.

In another embodiment of the instant invention, during the qualifying process, the method may include a final qualification approval process. During the final qualification approval process, the marketplace reviews the custom software application submission log and the qualified software application to determine if the qualified software application is ready for listing.

Once the marketplace lists the qualified software application in the qualified software application inventory, the prospective software buyers may search and make inquires regarding the qualified software application.

When the prospective software buyer finds the qualified software application that may work, the prospective software buyer may then execute the qualified software code with the test case as a demonstration. In addition, the prospective software buyer may access and view the qualified software documents. In another embodiment of the present invention, the method includes a step of transferring the qualified software application to the prospective software buyer. The marketplace may transfer the qualified software application to the prospective software buyer for additional testing. In another embodiment of the present invention, the method may include the step of encrypting the qualified software application prior to transferring it to the prospective software buyer.

The method may include piloting the qualified software application on a means for buyer testing, such as a prospective software buyer's system. Generally, piloting the qualified software application may be a more thorough demonstration, during which the buyer may make a decision to purchase the qualified software application. During the piloting process, the prospective software buyer may test the qualified software application with a means for testing computer analysis, which in one embodiment, is a prospective software buyer's test case. The prospective buyer may then be able to estimate a return on investment if they decide to purchase the qualified software application from the marketplace.

In another embodiment of the instant invention, the method may include forming a means for assessing recording deficiencies, such as a custom software application assessment. The custom software application assessment summarizes the attributes of the custom software application by analyzing the custom software application submission log. Once the marketplace forms the custom software application assessment, the marketplace compares the custom software application assessment with the final review standard to determine whether the custom software application satisfies the final review standard. The marketplace may then make a decision as to whether to reject the custom software application prior to the process of qualifying the custom software application.

These variations, modifications, alternatives, and alterations of the various preferred embodiments may be used alone or in combination with one another, as will become more readily apparent to those with skill in the art with reference to the following detailed description of the preferred embodiments and the accompanying figures and drawings.

BRIEF DESCRIPTION OF THE DRAWINGS

Without limiting the scope of the present invention as claimed below and referring now to the drawings and figures:

DETAILED DESCRIPTION OF THE INVENTION

A method of selling custom business software and a software exchange marketplace (100) of the instant invention enables a significant advance in the state of the art. The embodiments of the invention accomplish this by new and novel arrangements of elements and methods that are configured in unique and novel ways and which demonstrate previously unavailable but preferred and desirable capabilities. The detailed description set forth below in connection with the drawings is intended merely as a description of the present embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

Figure 1:
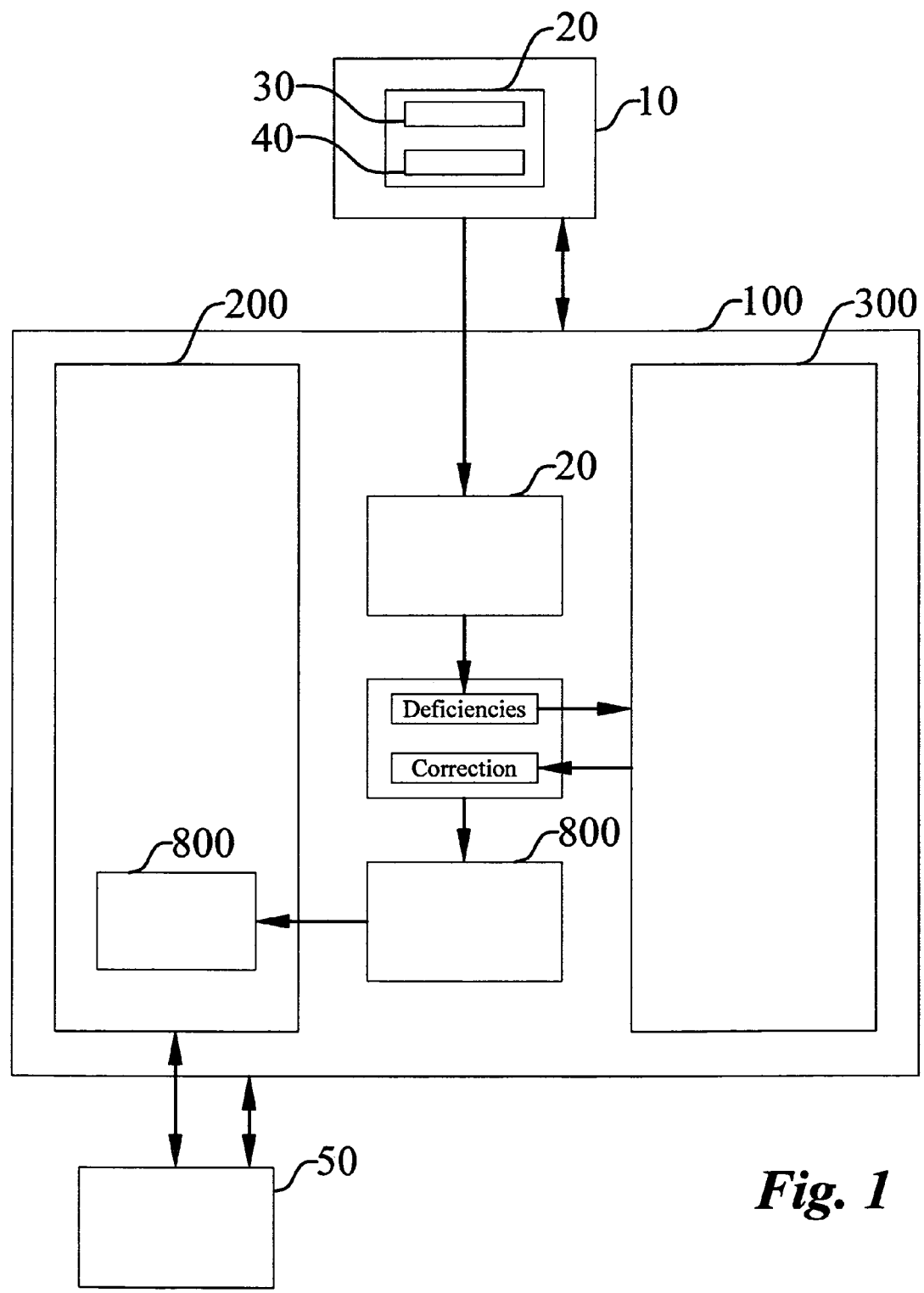
FIG. 1 is a flow chart illustrating an embodiment of a software exchange marketplace with a software seller and a prospective software buyer interacting with the software exchange marketplace.

With reference to FIG. 1, a method of selling custom business software incorporates a software exchange marketplace (100). In one embodiment, the software exchange marketplace (100) provides at least one software seller (10) with an opportunity to sell a custom means for computer analysis, such as a custom software application (20), to at least one prospective software buyer (50).

With reference generally to FIGS. 1 through 14, some of the figures have page connectors indicating a particular order of the figures. However, the method of selling custom business software is not limited to the order, as indicated herein. The connectors are provided only to facilitate explanation of one embodiment of the invention.

In one embodiment of the invention, the method of selling custom business software includes of the following steps. The software seller (10) submits the custom software application (20) to the marketplace (100) by, for example, mail, email, or FTP, depending upon the type of marketplace (100), as will be discussed later. After the software seller (10) submits the custom software application (20) to the marketplace (100), as seen in FIG. 1, the marketplace (100) first associates a means for recording deficiencies with the custom software application (20), such as a custom software application submission log (300), with the custom software application (20). The marketplace (100) then appraises the custom software application (20) to determine whether the custom software application (20) has commercial value by comparing various characteristics of the custom software application (20) with predetermined criteria. If the marketplace (100) determines that the custom software application (20) has commercial value, the marketplace (100) qualifies the custom software application (20) by transforming it into a qualified means for computer analysis, such as a qualified software application (800). The marketplace (100) then lists the qualified software application (800) for sale in a means for listing, such as a qualified software application inventory (200). As seen in FIG. 1, the marketplace (100) authorizes the prospective software buyer (50) to search the qualified software application inventory (200) for a qualified software application (800). Each of the above-mentioned steps will now be described in more detail.

First, as that term is used herein, software seller (10) means an entity, such as, a company, a person, and an association, which desires to sell their custom software application (20). In addition, as that term is used herein, custom software application (20) means any software developed or customized by the software seller (10) for the software seller's (10) use. Further, prospective software buyer (50) refers to companies, persons, and associations other than the software seller (10) who desire to purchase custom software applications (20) for their own use. For example, a software seller (10) may be similarly situated as a prospective software buyer (50), that is, the software seller's business may be similar to the prospective buyer's business such that the prospective software buyer (50) may be able to utilize the custom software application (20) from the software seller (10). Thus, the prospective software buyer (50) may desire to purchase the custom software application (20) from the software seller (10) to save time and money. However, the software seller (10) may not be in the business of selling software. Consequently, it may be difficult for the software seller (10) to sell their custom software application (20) directly to the prospective software buyer (50). Therefore, in one embodiment of the invention, the marketplace (100) provides the software seller (10) indirect access to the prospective software buyers (50).

By way of example, the software exchange marketplace (100) may be a digital environment with a physical existence manifested as a plurality of computers and servers in electrical communication with each other and possibly electronically linked via the Internet over vast distances. The software seller (10) and prospective software buyer (50) may, therefore, electronically interact with the marketplace (100). Also, as another example, the software exchange marketplace (100) may be one or more "brick and mortar" stores where software sellers (10) mail or otherwise deliver the custom software application (20) to the marketplace (100) and the prospective software buyer (50) may search for software by obtaining a catalog of available software or by entering the store.

With reference, once again, to FIG. 1, the custom software application (20) may include a means for performing computer analysis and a means for documenting computer analysis. In one embodiment, the performing computer analysis means is a software source code (30), and the documenting computer analysis means is a plurality of software documents (40). As is known in the art, the software source code (30) is an editable version of a computer executable code and is more easily understood by an IT professional. The software seller (10) compiles the software source code (30) to make the computer executable code. The software documents (40) may include paper, as well as non-paper files which instruct the IT professional on how to use the custom software application (20). The software documents (40) may also include information used to train others on the various functional aspects, and troubleshooting, of the custom software application (20). By way of example and not limitation, the custom software application (20) may be business software such as enterprise resource planning, or ERP, software. As is known in the art, ERP software is designed to integrate a plurality of business systems, such as a payroll system and an accounting system, into a single, shared system with a goal of making the business' operation more efficient.

Figure 2:
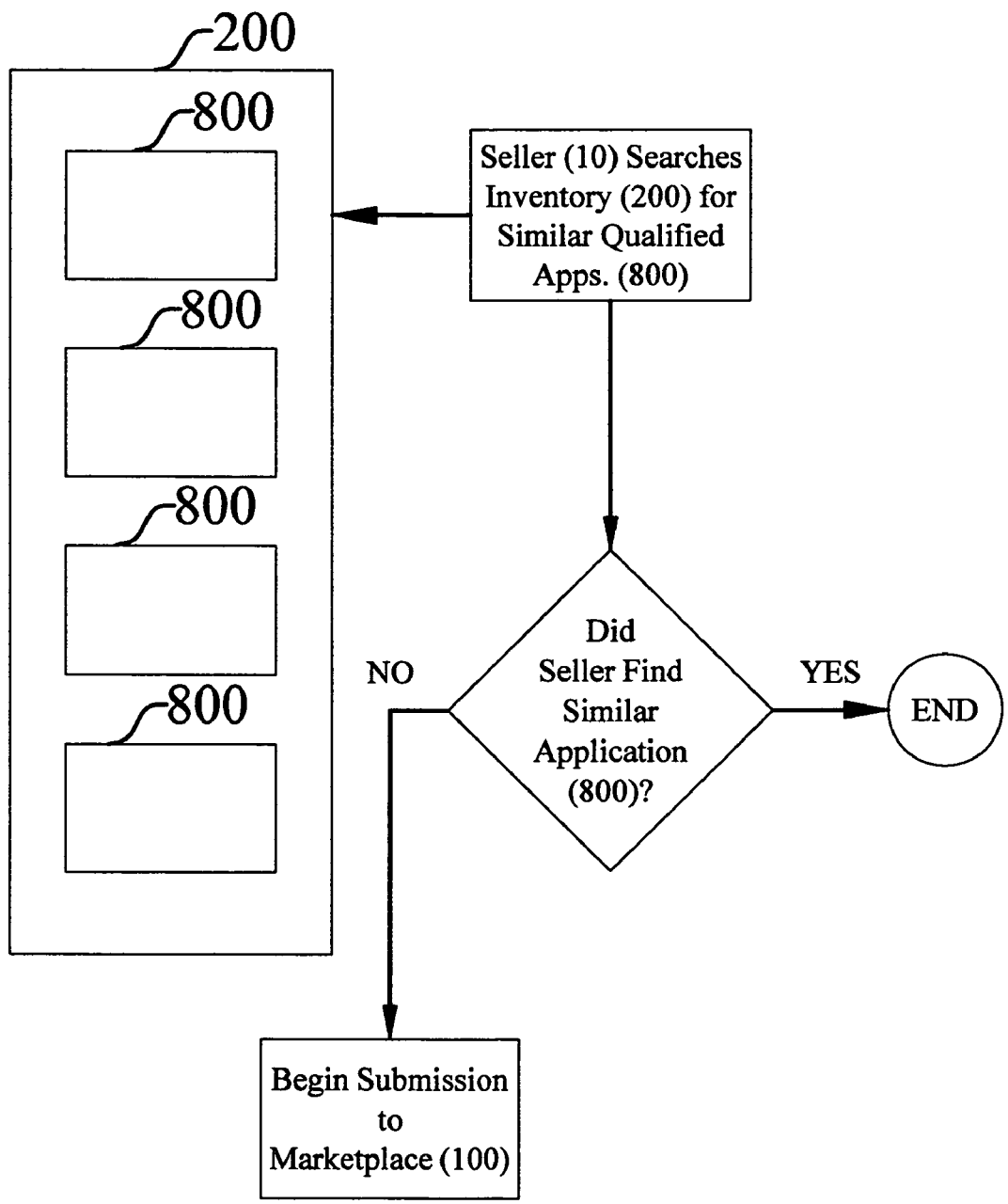
FIG. 2 is a flow chart illustrating an embodiment of the software exchange marketplace with the software seller searching a qualified software application inventory.

As seen in FIG. 1, the qualified software application inventory (200), which is one means for receiving and storing, contains qualified software applications (800) searchable by both software sellers (10) and prospective software buyers (50). In one embodiment of the method, as seen in FIG. 2, a first step may include a presubmission search by the software seller (10) of the qualified software application inventory (200) to determine if similar custom software applications (20) are already for sale in the marketplace (100). In the situation where the software seller (10) finds a qualified software application (800) that is similar to the customized software application (20), the software seller (10) need not waste time submitting their customized software application (20) to the marketplace (100). Similarly, the prospective software buyers (50) may search the qualified software application inventory (200) to determine if qualified software applications (800) exist that may be useable by the prospective software buyer (50).

Figure 3:
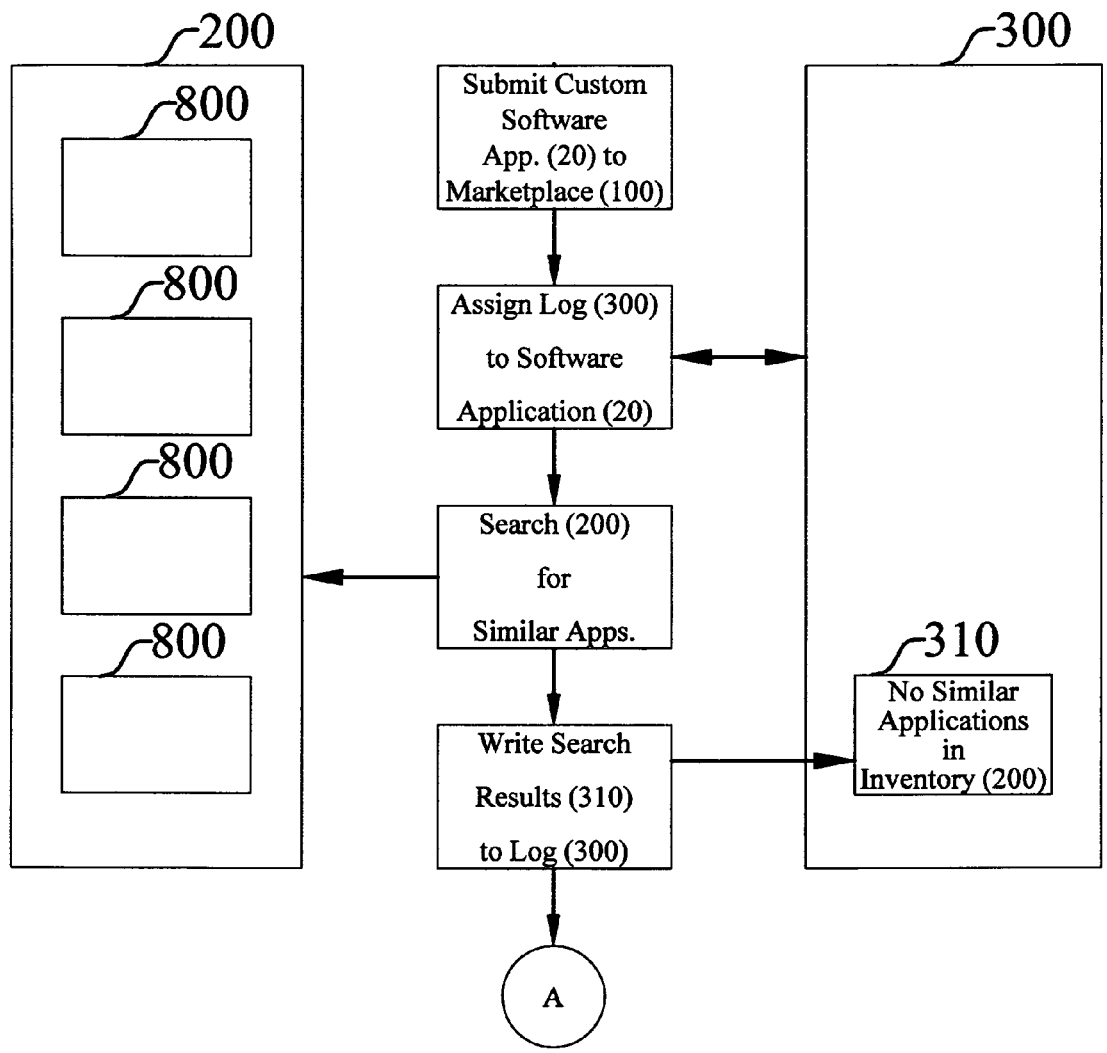
FIG. 3 is a flow chart illustrating an embodiment of the software exchange marketplace, having a custom software application submission log and the qualified software application inventory containing at least one qualified software application, with the software seller submitting a custom software application to the software exchange marketplace.

In an embodiment of the instant invention, as seen in FIG. 3, the method of selling custom business software begins after the software seller (10) submits the custom software application (20) to the marketplace (100). In a related embodiment of the instant invention, the software seller (10) may be required to provide information to the marketplace (100) prior to submitting the custom software application (20). By way of example only, the marketplace (100) may form a customer profile of the software seller (10) prior to receiving any custom software applications (20) from the software seller (10). The customer profile may consist of a login username and a password, as well as other security measures known in the IT industry. The marketplace (100) may then restrict access to the qualified software application inventory (200) to only software sellers (10) having customer profiles, thereby preventing unauthorized access to the qualified software application inventory (200). Thus, the method may prevent multiple similar versions of the custom software applications (20) from being listed in the qualified software application inventory (200).

With continued reference to FIG. 3, following submission of the custom software application (20), the marketplace (100) appraises the custom software application (20). In a first step of an appraisal process, as seen in FIG. 3, the marketplace (100) assigns the custom software application submission log (300) to the custom software application (20), which is one embodiment of the means for recording deficiencies. By way of example and not limitation, the custom software application submission log (300) may be used as a repository to record disclosure regarding characteristics of the custom software application (20). Furthermore, the custom software application submission log (300) may record information describing the custom software application's (20) dependencies, requirements, assumptions, integration points, and limitations. Other submission information requirements recorded in the custom software application submission log (300) may include: upload screencams and screenshots, benefits/metrics, system/platform type, search terms, pricing, contact information, override of profile defaults, and, possibly, an explanation of how the custom software application (20) is materially different from existing qualified software applications (800). The custom software application submission log (300) may serve as a centralized source for recording characteristics related to commercial value of the custom software application (20) and resources required to make the custom software application (20) commercially viable.

Once the custom software application submission log (300) is assigned, subsequent appraisal steps may record deficiencies or other problems identified with the custom software application (20) in the custom software application submission log (300). During the appraisal step, the marketplace (100) may determine whether the custom software application (20) has commercial value and what resources, if any, will be required to transform the custom software application (20) into the qualified software application (800). By way of example only, the qualified software application (800) may be a more commercially valuable version of the custom software application (20). Unless noted otherwise, the following appraisal steps may proceed simultaneously and the process may not be serial, as described herein.

Figure 10:
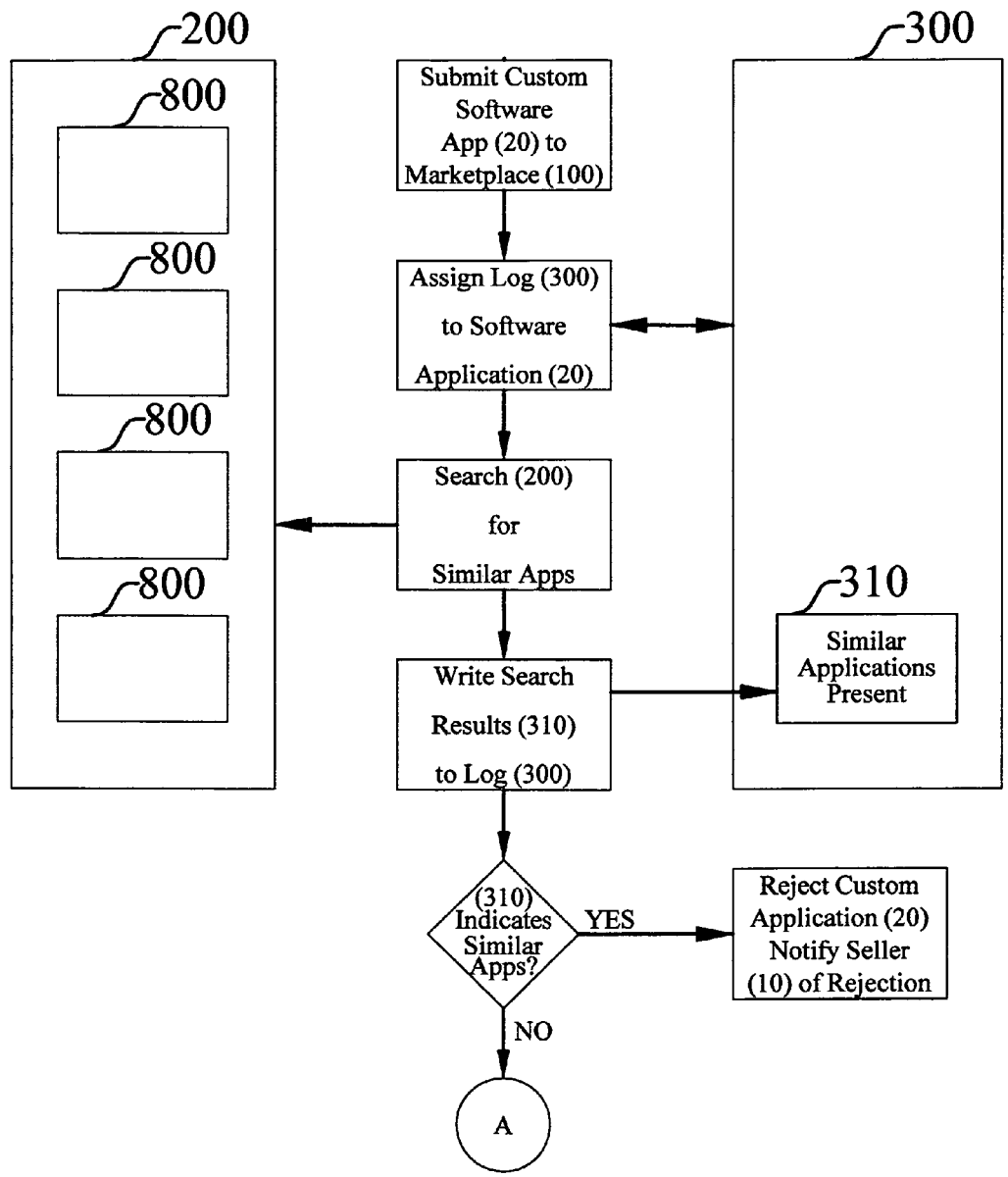
FIG. 10 is a flow chart illustrating an embodiment of the software exchange marketplace rejecting the custom software application based on a search of the qualified software application inventory with a search result being recorded in the custom software application submission log.

In another step following submission of the custom software application (20), as seen in FIG. 3, the marketplace (100) may search the qualified software application inventory (200) to determine if any of the qualified software applications (800) present are similar to the custom software application (20). The marketplace's search of the qualified software application inventory (200) may be automated or may require human input. A search result (310) is recorded in the custom software application submission log (300). By way of example and not limitation, the search result (310) may include the various search criteria that the marketplace (100) used to perform the search. The search result (310) may also include the number of hits and the similarity between each hit and the custom software application (20), possibly indicated as a percent of similarity, or relevancy. For example, a percent of similarity of 100% may represent that the custom software application (20) is the same as a qualified software application (800) in the qualified application inventory (200). In one particular embodiment of the invention, as seen in FIG. 10, the marketplace (100) rejects the custom software application (20) when the marketplace (100) records the search result (310) in the qualified software application submission log (300) that indicates that a similar software application is already in the marketplace (100), as determined by a predetermined maximum relevancy threshold or other comparison technique. By way of example and not limitation, the marketplace may manually search the qualified software application inventory (800), or the search may be automatically performed according to predetermined criteria.

Figure 11:
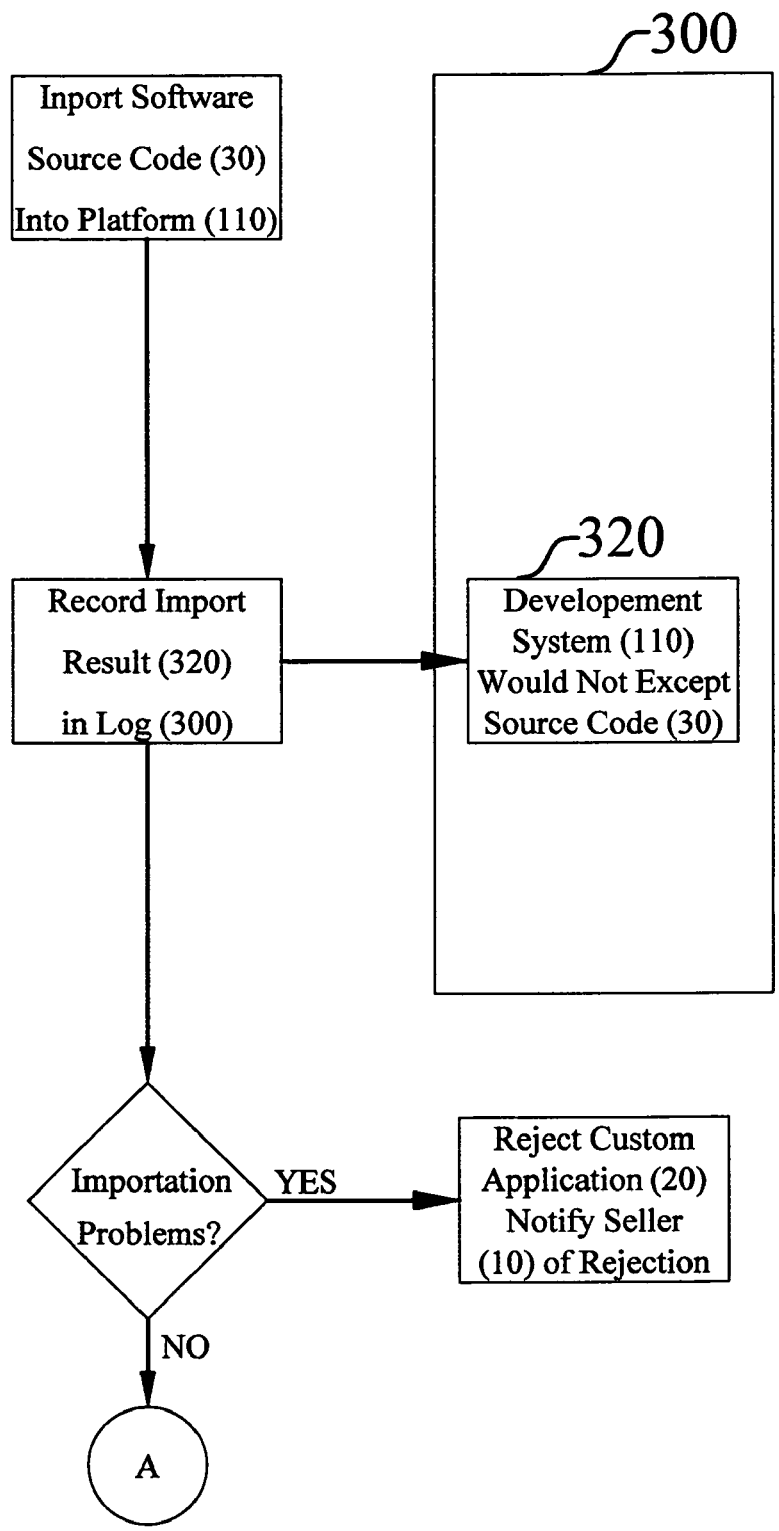
FIG. 11 is a flow chart illustrating an embodiment of the software exchange marketplace with the custom software application imported to a platform specific development system and at least one importation problem recorded in the custom software submission log resulting in rejection of the custom software application from the software exchange marketplace.

As seen in FIG. 11, in another embodiment of the instant invention, the method further includes a step of importing the software source code (30) into a means for receiving and storing the software source code (30). The receiving and storing means may be, for example, a platform specific development system (110). The platform specific development system (110) may be a computer, server, other device, or network, configured with software necessary to import, edit, and execute the software source code (30). By way of example and not limitation, the platform specific development system (110) may be a server with a SAP R/3 or a SAP NetWeaver® (SAP NetWeaver® is a trademark of SAP AG Joint Stock Company; Federal Republic of Germany) environment, which permits IT professionals to modify existing SAP based custom software applications (20).

The IT professionals may import the software source code (30) into the platform specific development system (110) in at least two ways. One is with a transport file containing the software source code (30). Alternatively, the IT professional may upload the software source code (30) directly into a program and then manually activate it.

When the marketplace (100) imports the software source code (30) into the platform specific development system (110), the marketplace (100) may record any problems or issues associated with importation process as at least one importation result (320). On one hand, the importation result (320) may be that the software source code (30) was imported without incident. On the other hand, the importation result (320) may be that the software source code (30) was not identifiable to the platform specific development system (110). Other importation results (320) include, for example, authorization issues where the IT professional is not authorized to open objects, corruption issues due to improper formatting of the software source code (30), and activation issues either from incorrect or improper referencing between table-field references and data elements or from improper calls between modules. The importation result (320) may be recorded in the custom software application submission log (300). In a related embodiment of the instant invention, as seen in FIG. 11, the marketplace (100) rejects the custom software application (20) when the custom software application submission log (300) records importation results (32) that indicate problems above a predetermined quantity or above a predetermined level of severity. As one skilled in the art will appreciate, the rejection may be by manual notification to the software seller (10) or automatically generated by email, or other electronic means, directed to the software seller (10).

Figure 4:
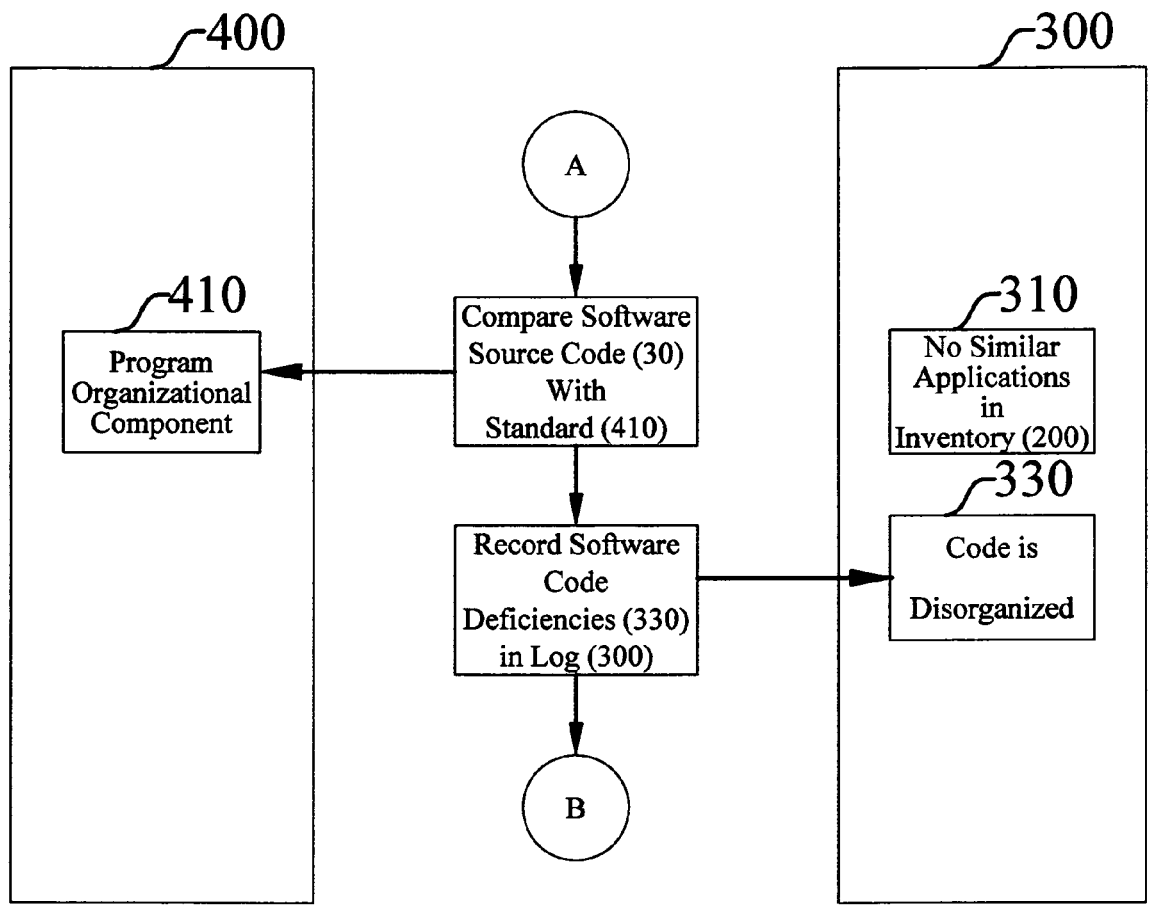
FIG. 4 is a flow chart illustrating an embodiment of the software exchange marketplace, having a source code qualification standard, and the software source code having at least one software code deficiency.

With reference now to FIG. 4, in another embodiment of the instant invention, the marketplace (100) has at least one standard. The marketplace (100) uses the standard to appraise the commercial value of the custom software application (20). The standard may also establish a level of quality for the qualified software applications (800) that are listed in the qualified application inventory (200). Therefore, the prospective software buyers (50) may be assured that the qualified software applications (800) in the marketplace (100) are quality applications worth purchasing. By way of example, and not limitation, the standards may include a means for standardizing software code, such as a source code qualification standard (400); a means for standardizing software documents, such as a document qualification standard (500); and means for identifying commercially valuable custom software applications, such as a final review standard (700).

In the embodiment, as seen in FIG. 4, the source code qualification standard (400) has a means for standardizing software code organization, such as a program organization component (410). The software source code (30) is compared with the program organization component (410). In this embodiment of the invention, the marketplace (100) records any organizational errors or potential logic problems with the software source code (30) as at least one software code deficiency (330) in the custom software application submission log (300). By way of example and not limitation, the custom software application submission log (300) may record other specific types of issues with the software source code (30). In other words, the source code qualification standard (400) may establish acceptable types and quantities of deficiencies in the software source code (30). In particular, the program organization component (410) ensures that the marketplace (100) reviews the software source code (30) and identifies deficiencies that detract from the market value of the custom software application (20), for example, lack of adherence to standard programming guidelines, including, but not limited to, poor clarity, poor maintainability, unclear or violation of naming conventions, not following standard indentation rules, and lack of modularization. As one skilled in the art will appreciate, poorly written software code is difficult to debug, hard to logically follow, and may present unforeseeable difficulties when it is integrated into existing systems. The marketplace (100) may also assess complexity of the software source code (30) during the appraisal process. By way of example, and not limitation, the complexity may be rated on a scale from 1 to 5 or on a scale of low/medium/high complexity.

Figure 5:
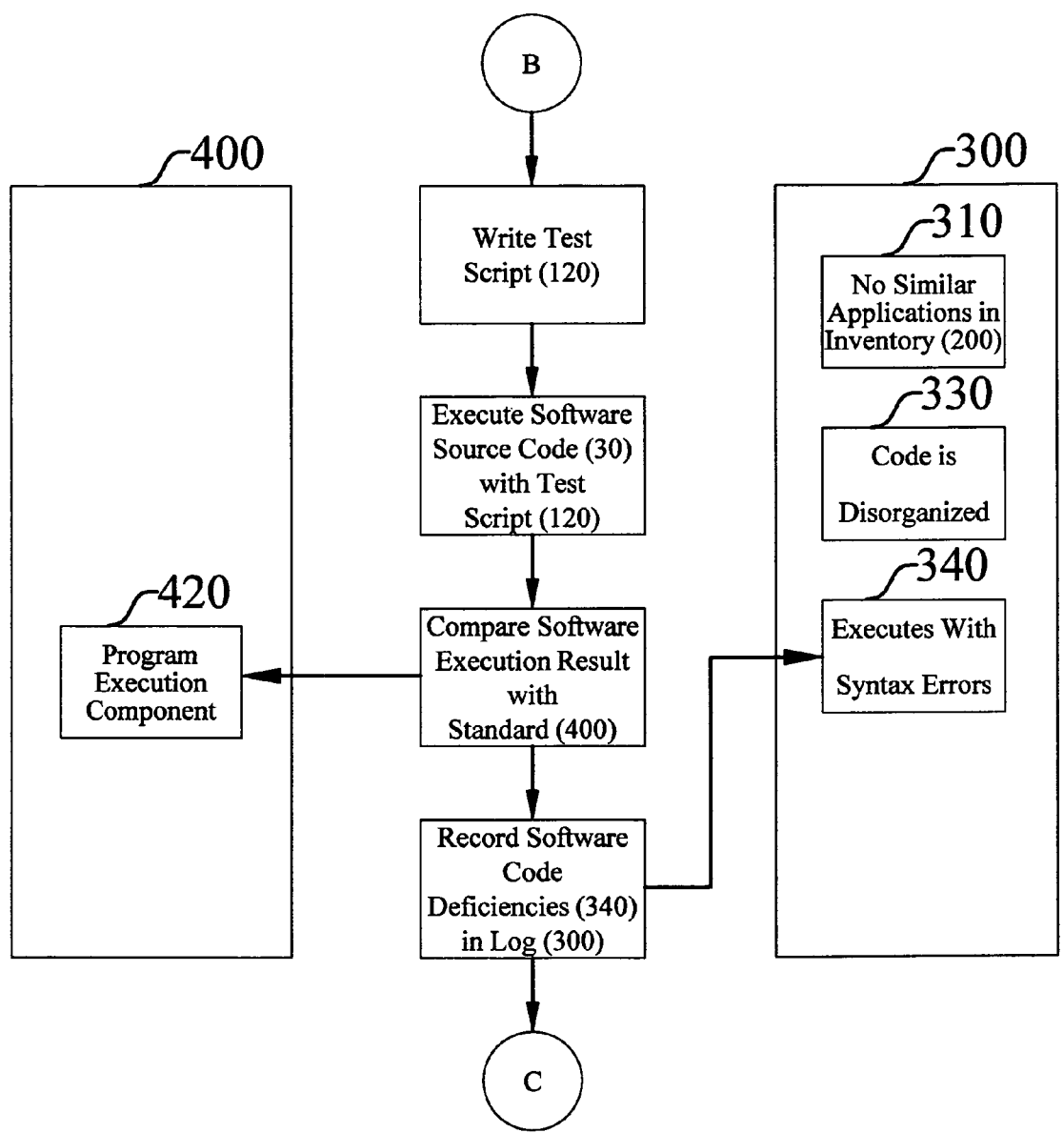
FIG. 5 is a flow chart illustrating an embodiment of the software exchange marketplace, having a source code qualification standard, and the software source code having at least one software execution deficiency.

In another embodiment, as seen in FIG. 5, the marketplace (100) may create a test script (120) to test the software source code (30). The source code qualification standard (400) may also include a means for standardizing software code execution. The standardizing software code execution means may be, for example, a program execution component (420). The program execution component (420) is compared to an execution result of the software source code (30) with the test script (120). Any deficiencies identified during the comparison may be recorded in the custom software application submission log (300) as at least one software execution deficiency (340). For example, the custom software application submission log (300) may record software execution deficiencies (340), such as Structured Query Language (hereinafter "SQL") statements that reference a table without using indices and calls to function modules that do not account for all of the errors that could occur. The software execution deficiencies (340) may be technical or functional in nature. Furthermore, technical execution deficiencies, possibly caused by inefficient SQL statements, may include divide by zero errors which cause abnormal execution or excessive execution runtime for foreground tasks. Functional execution deficiencies may include actual results that are not the same as the expected results, or the software source code (30) does not create reports as it should.

In addition, the test script (120) may include any of a plurality of inputs, steps to execute the test script (120), and at least one expected result for execution of the test script (120). The inputs may include actual test data and any system requirements, and the steps to execute the test script (120) may list all of the key strokes required to produce the expected results. Furthermore, the expected results of the test script (120) may define both the outputs and how to access and display the expected results.

In another embodiment of the instant invention, in SAP R/3, the seller (10) supplies the test script (120). The test script (120) defines a transaction code and data that the marketplace (100) uses to execute the software source code (30). The test script (120) explains the appropriate values to include in the data fields, such that the marketplace (100) may evaluate the software source code (30). The software documents (40), as described above, may also be evaluated.

Figure 6:
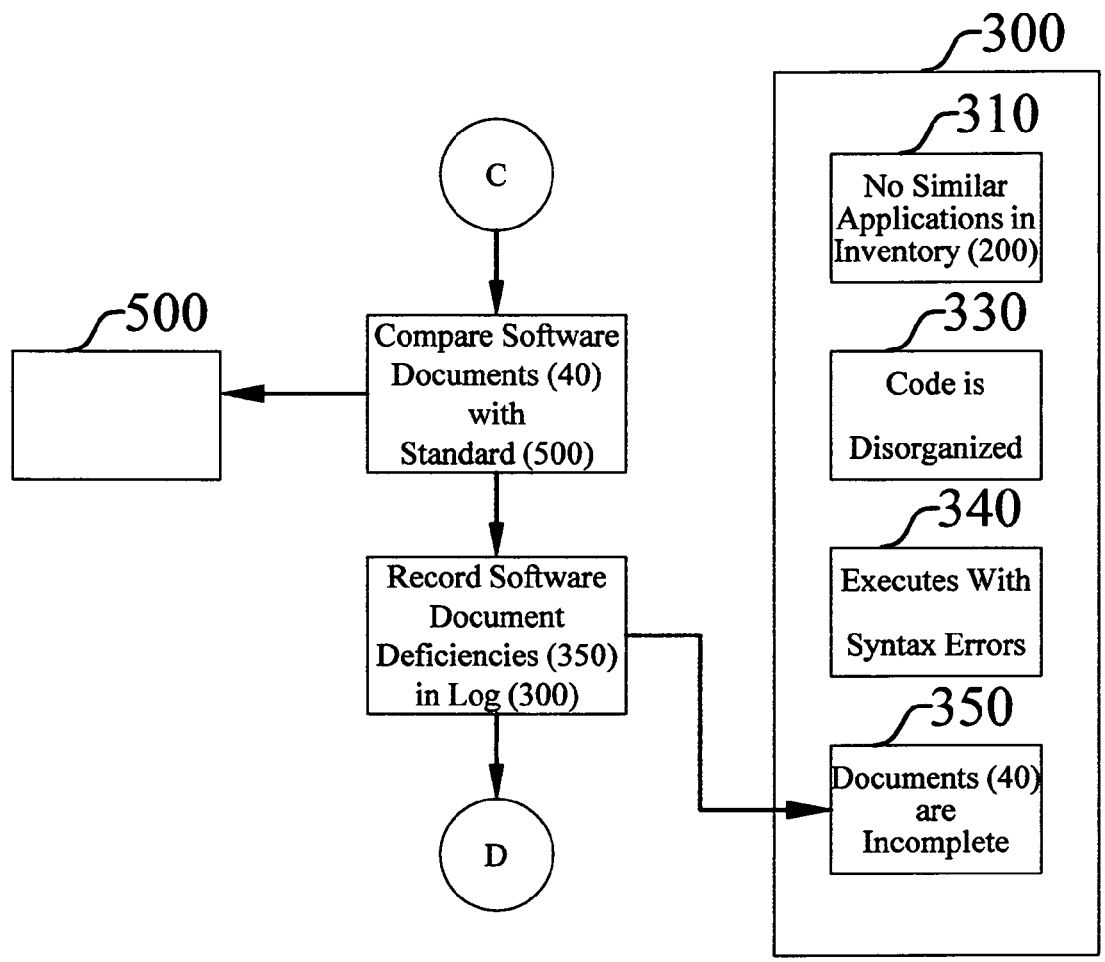
FIG. 6 is a flow chart illustrating an embodiment of the software exchange marketplace, having a document qualification standard and at least one software document having a document deficiency.

With reference now to FIG. 6, the software documents (40) are compared with the standardizing software document means, which, in one embodiment, is the document qualification standard (500). By way of example and not limitation, the document qualification standard (500) may include a review of a plurality of technical documents, a review of a functional-use summary, and a review of a plurality of troubleshooting documents. The technical documents may include system requirements, required object files, and contact information. The functional-use summary may include information related to how the software source code (30) integrated with a seller's system, as well as what the software source code (30) accomplishes. The troubleshooting documents may include contact information and a general overview of the software source code (30). The comparison of the software documents (40) with the document qualification standard (500) may consist of a check of specific items, including documentation completeness, grammar, punctuation, and readability. Issues with the software documents (40)

are recorded in the custom software application submission log (300) as at least one document deficiency (350), as seen in FIG. 6.

In one embodiment of the instant invention, the marketplace (100) may reject the custom software application (20) or request for more information from the software seller (10) at any time. Rejection may depend on the nature of any issue encountered during appraisal of the custom software application (20). In another embodiment, the method of selling has predetermined steps for determining whether to reject the custom software application (20). Once the marketplace (100) has compared the custom software application (20) with the source code qualification standard (400) and the document qualification standard (500) and the custom software application submission log (300) has recorded any deficiencies (330, 340, 350), the marketplace (100) may reject the custom software application (20), request more information from the software seller (10), or continue with the appraisal. If the marketplace (100) rejects the custom software application (20), it may do so because the custom software application (20) does not satisfy the final review standard (700) due to any number of factors. For example, the software source code (30) may fail to execute properly, an asking price is too high, too much time and too many resources will be required to address the deficiencies (330, 340, 350) to bring the custom software application (20) to the quality standards set by the marketplace (100), and the prospective software buyers (50) for custom software application (20) are too few in number.

Figure 7:
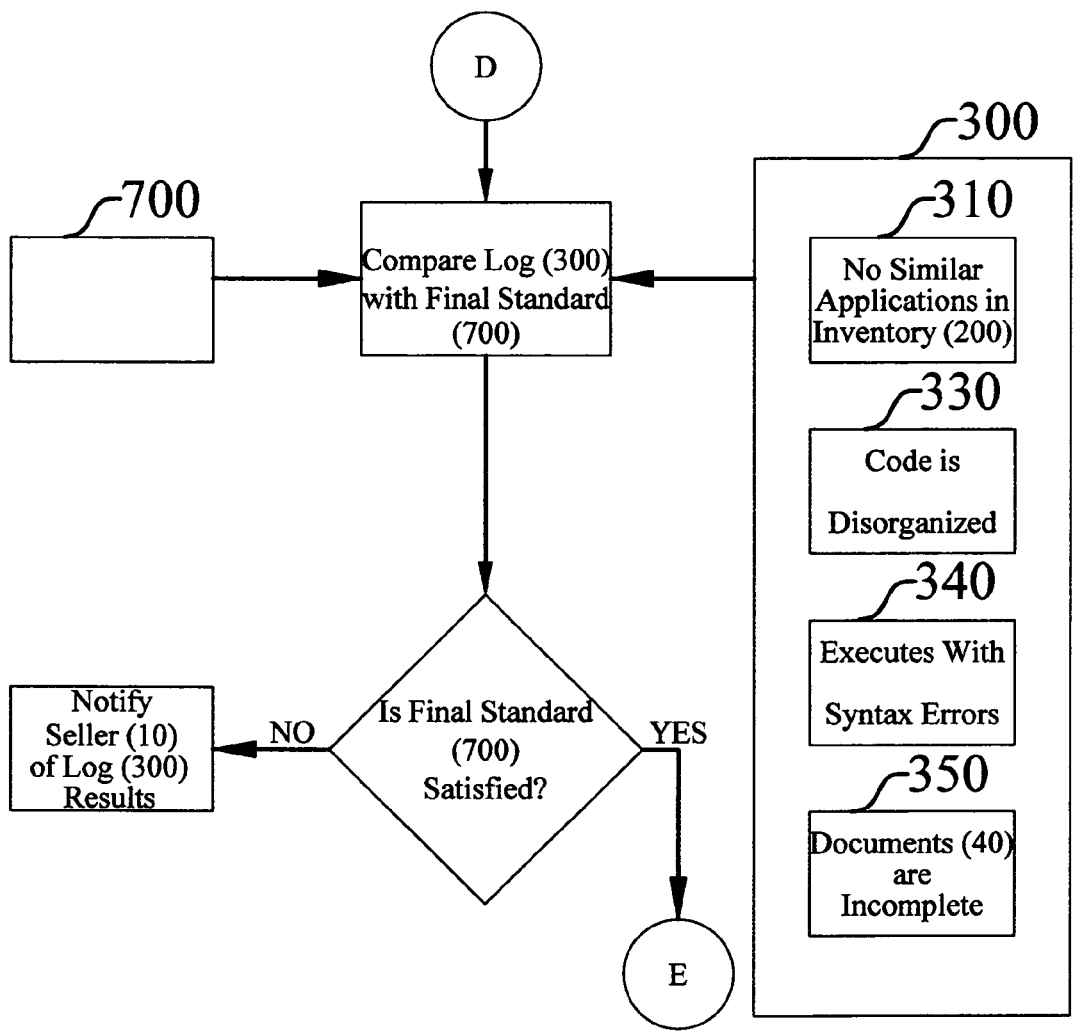
FIG. 7 is a flow chart illustrating an embodiment of the software exchange marketplace having a final review standard.

Referring now to FIG. 7, in one embodiment, the method of selling custom business software includes a step for comparing the custom software application submission log (300), possibly containing the search result (310) and records of any deficiencies (330, 340, 350), with the final review standard (700), which is one embodiment of a means for identifying commercially valuable custom software applications. During this step, as seen in FIG. 7, the marketplace (100) determines whether the custom software application (20) satisfies the final review standard (700). If the final review standard (700) is satisfied, then the marketplace (100) may accept the custom software application (20). Consequently, the final review standard (700) may provide a threshold quality requirement for the custom software application (20) to be accepted by the marketplace (100). In other words, the final review standard (700) may provide the marketplace (100) with an objective standard containing a plurality of criteria for identifying those custom software applications (20) that have, market value. In the simplest of explanations, market value may mean that the costs required to qualify, as discussed below, the custom software application (20) are less than the perceived revenues that the sale of the custom software application (20) will generate. Once accepted, as mentioned above, the marketplace (100) qualifies the custom software application (20) for listing in the custom software application inventory (200).

After the marketplace (100) accepts the custom software application (20), qualification may begin by renaming the software source code (30) according to a standard naming convention. As one skilled in the art will observe and appreciate, renaming the custom software application (20) keeps the various marketplace network storage systems organized. Specifically, all of the custom objects, for example, all tables, data elements, programs, and other files comprising the custom software application (20), may be renamed according to the convention.

In another embodiment of the instant invention, upon acceptance the marketplace (100) may assign a software broker to the custom software application (20). The software broker may be a professional who is tasked with the responsibility of managing the custom software application (20) through the qualification and listing processes, as well as marketing the qualified software application (800) to the prospective software buyers (50).

With reference back to FIG. 1, and as previously mentioned, the method may include the step of qualifying the custom software application (20) by correcting some of the deficiencies recorded in the custom software application submission log (300). During the qualification process, the marketplace (100) transforms the custom software application (20) into the qualified software application (800).

Figure 8:
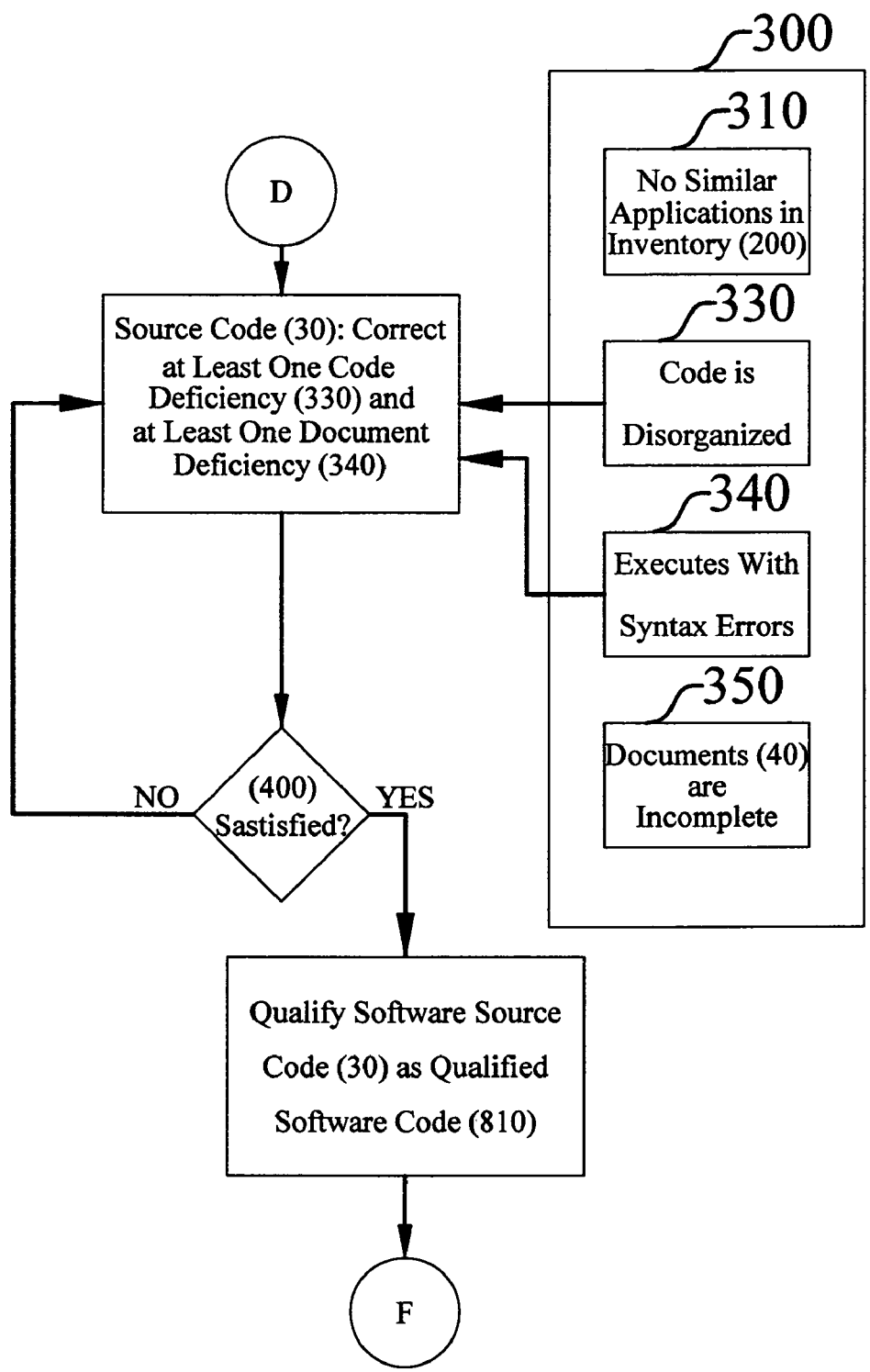
FIG. 8 is a flow chart illustrating an embodiment of the software exchange marketplace having the software source code transformed into a qualified source code.

Now, with reference to FIG. 8, a portion of the qualification process is described. The marketplace (100) qualifies the software source code (30) by transforming it into a qualified means for performing computer analysis, which in one embodiment, is a qualified source code (810) As seen in FIG. 8, during qualification at least one of the software code deficiencies (330) or at least one of the software execution deficiencies (340), or both, are corrected so that the source code qualification standard (400) is satisfied, thereby transforming the software source code (30) into the qualified source code (810). As one skilled in the art will observe, by correcting the software execution deficiencies (340) such that the software source code (30) satisfies the source code qualification standard (400), the prospective software buyers (50) may identify the marketplace (100) with providing a known quality of qualified software applications (800). Similarly, the method also transforms the software documents (40).

Figure 9:
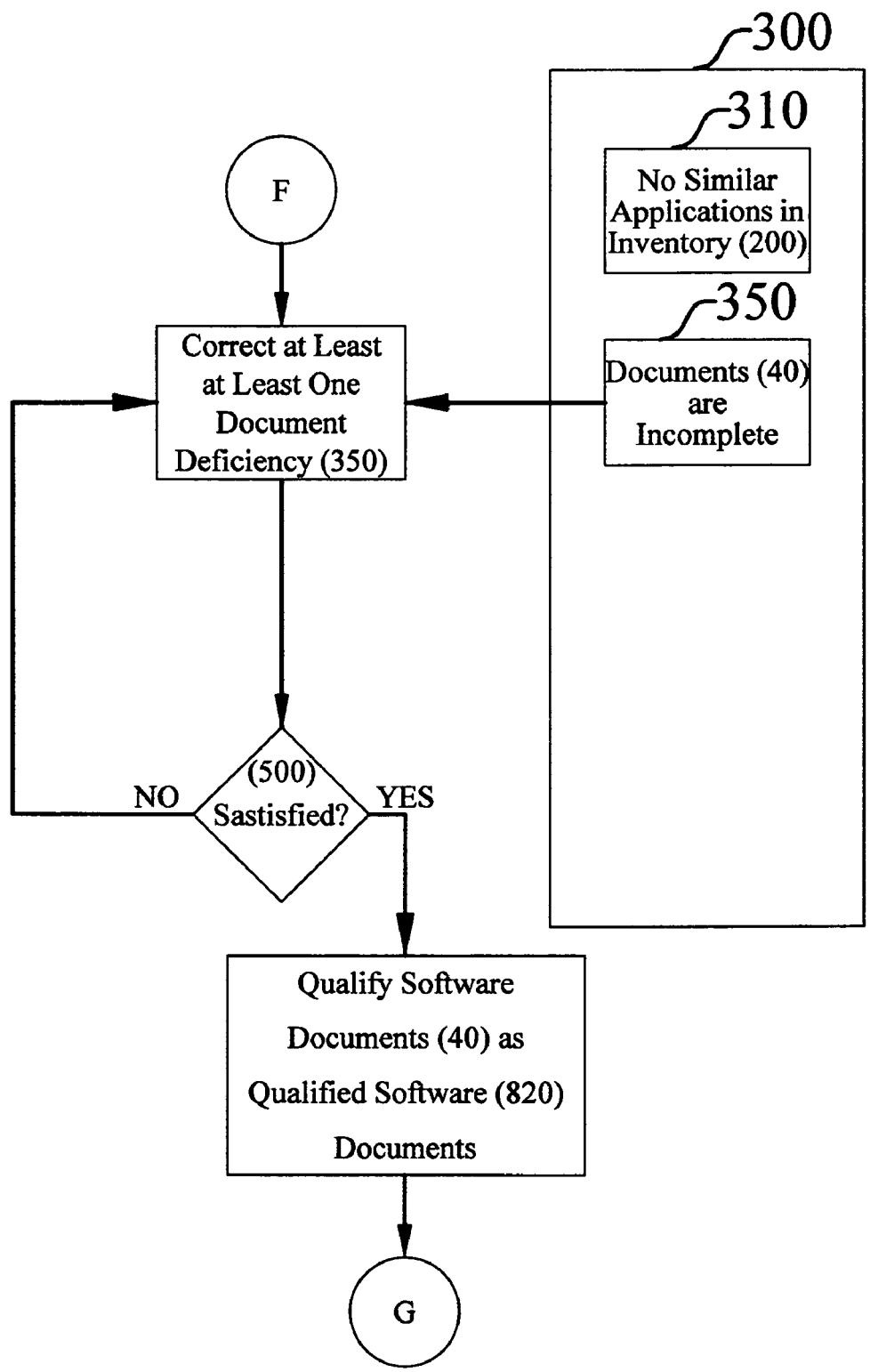
FIG. 9 is a flow chart illustrating an embodiment of the software exchange marketplace having at least one software document transformed into at least one qualified software document.

With reference to FIG. 9, during qualification, the marketplace (100) also qualifies the software documents (40) to transform them into a qualified means for documenting computer analysis. In one embodiment, the documenting computer analysis means is a qualified software document (820). The marketplace (100) corrects at least one of the document deficiencies (350) recorded in the custom software application submission log (300) during the appraisal process. Once the software documents (40) satisfy the document qualification standard (500), the software documents (40) become qualified software documents (820). As one skilled in the art will observe and appreciate, it is possible that either one, or both, of the software source code (30) and the software documents (40) satisfies their respective standards during appraisal. In other words, during the appraisal process the marketplace (100) did not record any deficiencies (330, 340, 350) in the custom software application submission log (300). Consequently, the software source code (30) and the software documents (40) may not require correction prior to qualification. The marketplace (100) may qualify the software source code (30) and the software documentation (40) simultaneously, or in series, as described herein.

In yet another embodiment of the instant invention, the method includes developing, associating, and executing a test case (130) with the qualified source code (810). The test case (130) includes a set of variables and it interacts with the qualified source code (810). By way of example and not limitation, the test case (130) may demonstrate the applicability of the qualified source code (810) in a generic business operation. The test case (130) may include the test script (120) and, in addition, may include an overview of the test case (130) that describes what purpose the qualified source code (810) serves. The prospective software buyer (50) may then more easily relate the qualified software application (800) to their business. The test case (130) may be written to be applicable to as many prospective software buyers (50) as possible. As discussed below and seen in FIG. 12, the marketplace (100) may provide the prospective software buyer (50) with access to the test case (130) and the authority to execute it. By way of example and not limitation, developing the test case (130) may require maintaining custom tables, adding in required configuration settings, and creating prospective software buyer (50) identifications prior to allowing the prospective software buyer (50) access to the test case (130).

In another embodiment of the instant invention, during the qualifying process, the method may include a final qualification approval process. During the final qualification approval process, the marketplace (100) reviews the custom software application submission log (300) and the qualified software application (800) to determine if the qualified software application (800) is ready for listing. The final qualification approval process may include a review of the search result (310) and any deficiencies (330, 340, 350) recorded in the custom software application submission log (300). In addition, the final qualification approval process may review corrections made to the software source code (30) and the software documents (40) based on the deficiencies (330, 340, 350) that were recorded and how the software source code (30) and the software documents (40) satisfied the final review standard (700). As one skilled in the art will observe, the final qualification approval process may be complete review prior to offering the qualified software application (800) for sale to ensure that the marketplace (100) offers quality products. By way of example and not limitation, the final qualification approval process may be automatic, according to predetermine criteria, or it may be performed by a management team comprised of professionals, potentially including the software broker, having significant experience in the business of selling business software. Once the qualified software application (800) is approved, the qualified software application (800) is listed, as seen in FIG. 1, in the qualified software application inventory (200).

Once the marketplace (100) lists the qualified software application (800) in the qualified software application inventory (200), as seen in FIG. 1, the prospective software buyers (50) may search and make inquires regarding the qualified software application (800). The marketplace (100) may make a variety of search engines available to prospective software buyers (50). The search engine may search, for example, by release date, industry type, module type, search terms, and other characteristics of the qualified software applications (800).

In another embodiment of the instant invention, the method includes a step for registering the prospective software buyers (50). Thus, the prospective software buyers (50) may be required to register with the marketplace (100) prior to accessing the qualified software application inventory (200). Once the prospective software buyer (50) accesses or logs into the marketplace (100) with a username and a password, as are known in the art, the prospective software buyer (50) may search the qualified software application inventory (200).

Figure 12:
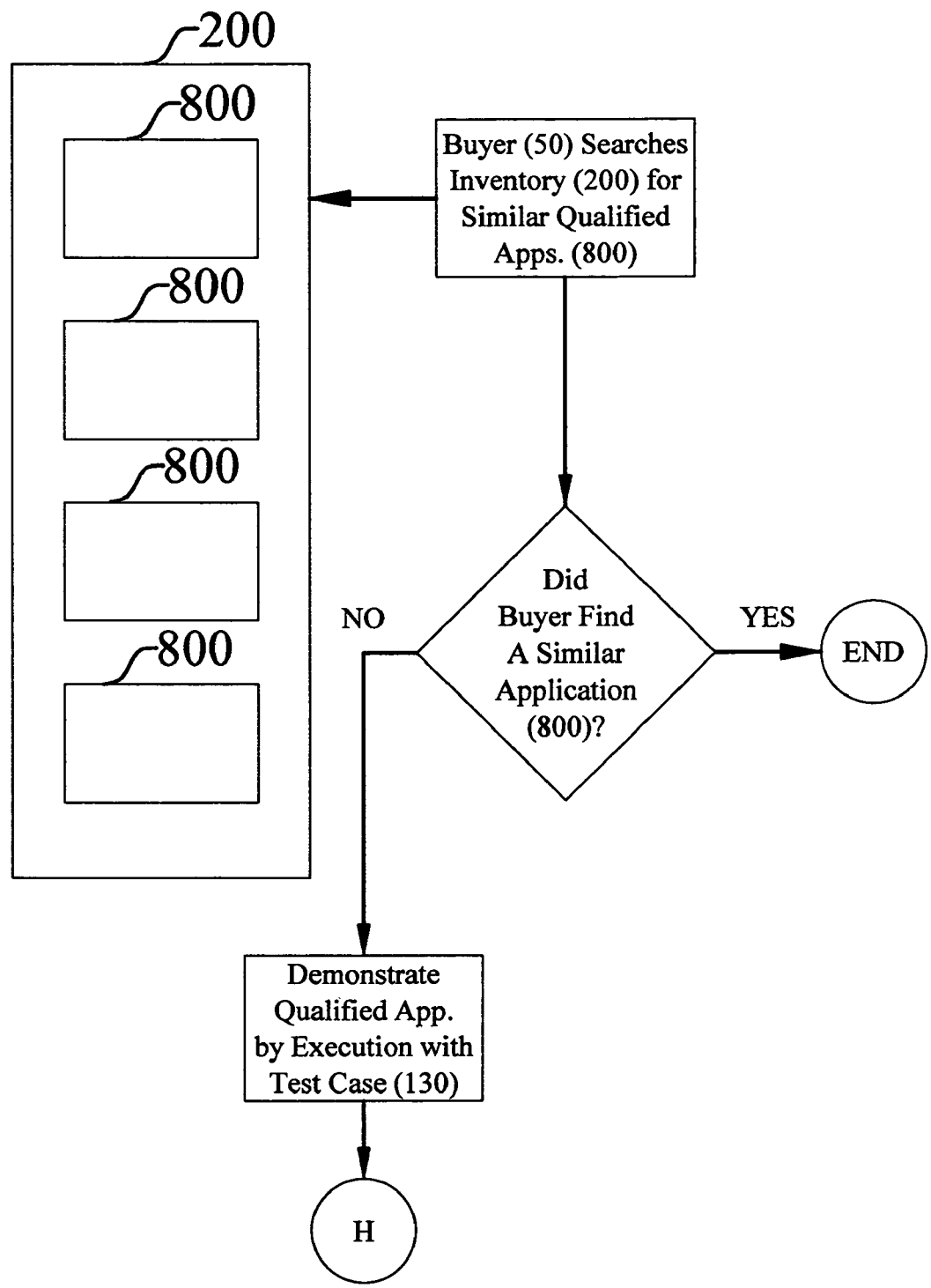
FIG. 12 is a flow chart illustrating an embodiment of the software exchange marketplace with the prospective software buyer searching the qualified software application inventory and having a test case associated with the qualified software application so that the prospective software buyer may execute the qualified software application with the test case.

When the prospective software buyer (50) finds the qualified software application (800) that may work, as seen in FIG. 12, the prospective software buyer (50) may then execute the qualified software code (810) with the test case (130) as a demonstration. In addition, the prospective software buyer (50) may access and view the qualified software documents (820). Though, in one particular embodiment, limited access to the qualified software application inventory (200) is maintained by requiring the prospective software buyer (50) to register with the marketplace (100), as discussed above. In addition, even if the prospective software buyer (50) is registered, only a partial documentation package may be available for the prospective software buyer (50) to view. A full version of the qualified software documents (820) may be made available when the prospective software buyer (50) buys the qualified software application (800). The marketplace (100) may not permit the prospective software buyer (50) access to, or display of, the qualified source code (810). However, a registered prospective software buyer (50), who is interested in purchasing the qualified software application (800), may execute the test case (130) on the platform specific development system (110) to see how the qualified software application (800) performs in a generic, real-world example. In another particular embodiment of the invention, the marketplace (100) is equipped to provide a WebEx demo, as is know in the art of teleconferencing, to prospective software buyers (50) who make that request.

In another embodiment of the present invention, the method includes a step of transferring the qualified software application (800) to the prospective software buyer (50). The marketplace (100) may transfer the qualified software application (800) to the prospective software buyer (50) for additional testing. The type of transfer that may occur may depend upon the type of marketplace (100), as previously discussed. For example, if the marketplace (100) is the digital environment in electronic communication other digital equipment accessible to the prospective software buyer (50) then the marketplace (100) may transfer the qualified software application (800) via FTP or email. The marketplace (100) may transfer the qualified software application (800) simply by placing a CD or other electronic storage media in the U.S. mail addressed to the prospective software buyer (50), or by handing a box containing the qualified software application (800) directly to the prospective software buyer (50).

In another embodiment of the present invention, the method may include the step of encrypting the qualified software application (800) prior to transferring it to the prospective software buyer (50). As is known in the art, encrypting the qualified software application (800) may limit various functions of the qualified software application (800). For example, encryption may limit the time that the qualified software application (800) will work. After expiration of authorized time the qualified software application (800) shuts down and will not execute. The prospective software buyer (50) must then purchase the qualified application (800) or contact the marketplace (100) to request more time for evaluation. One other type of encryption may limit the functionality of the qualified software application (800), known in the art as a "demo" version.

Figure 13:
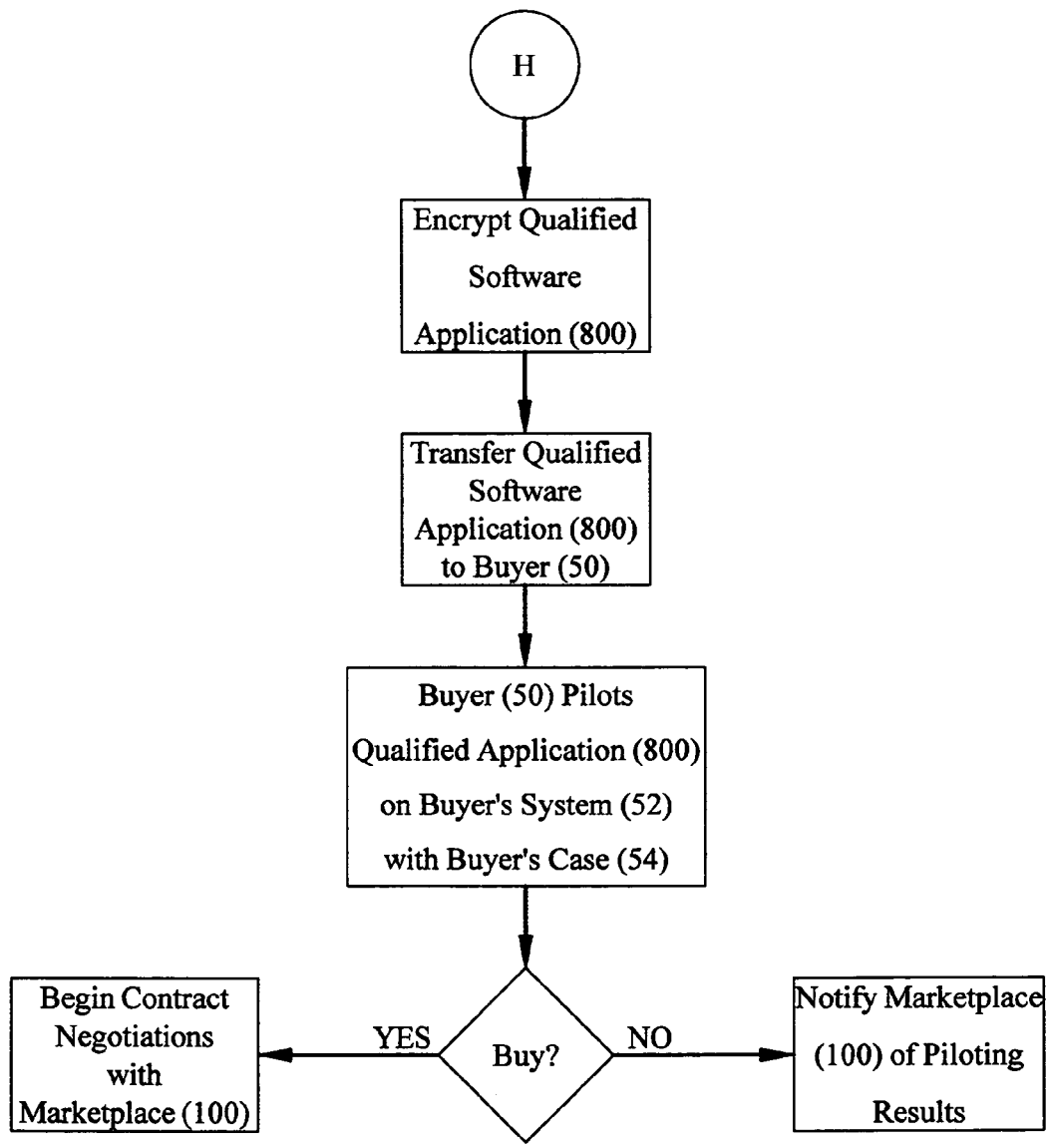
FIG. 13 is a flow chart illustrating an embodiment of the software exchange marketplace showing steps for encrypting the qualified software application, transfer of the qualified software application to the prospective software buyer, and piloting the qualified software application on the prospective software buyer's system.

As seen in FIG. 13, the method may include piloting the qualified software application (800) on a means for buyer testing, such as, a prospective software buyer's system (52). The buyer testing means may also include, for example, a network of servers and other devices or a stand-alone computer system. Generally piloting the qualified software application (800) may be a more thorough demonstration, during which the buyer may make a decision to purchase the qualified software application (800). Piloting the qualified software application (800) on the prospective software buyer's system (52) may include checking how the qualified source code (810) loads onto the buyer's system (52), investigating potential integration point problems, and user interface issues. Piloting may also include evaluation of the qualified documents (820) by the buyer's IT professionals for readability and technical compatibility.

During the piloting process, the prospective software buyer (50) may test the qualified software application (800) with a means for testing computer analysis, which in one embodiment is a prospective software buyer's test case (54). As one skilled in the art will observe, the prospective buyer's test case (54) may be a more accurate reflection of the prospective software buyer's (50) targeted application. In other words, the prospective software buyer (50) may develop a better understanding as to whether the qualified software application (800) will work and perform according to the prospective software buyer's expectations within the prospective software buyer's system (52). Thus, testing on the prospective buyer's system (52) may provide the prospective software buyer (50) with an estimate of how much time and what resources will be required to make the qualified software application (800) work. The prospective buyer (50) may then be able to estimate a return on investment if they decide to purchase the qualified software application (800) from the marketplace (100). By way of example and not limitation, the prospective software buyer's system (52) may be in operative communication with the platform specific development system (110) such that transfer may occur via email or FTP.

In yet another embodiment of the instant invention, various contractual arrangements are made between the software seller (10) and the marketplace (100), as well as between the marketplace (100) and the prospective software buyer (50), such as purchase agreements and confidentiality agreements. The marketplace (100) may automatically generate the agreements when the prospective software buyer (50) decides to purchase the qualified software application (800). When the prospective software buyer (50) purchases the qualified software application (800), the marketplace (100) may automatically update the qualified software application inventory (200), and associate the prospective software buyer (50) with purchase of the qualified software application (800) for later use. In another embodiment of the instant invention, the marketplace (100) may require that prospective software buyers (50) to agree not to copy any of the qualified source code (810) or any of the qualified software documents (820) prior to purchasing the qualified software application (800). In yet another embodiment of the instant invention, the marketplace (100) may attempt to prevent prospective software buyers (50) who are direct competitors with the software seller (10) from purchasing the qualified software application by preventing specific prospective software buyers (50) from accessing specific qualified software applications (50).

Figure 14:
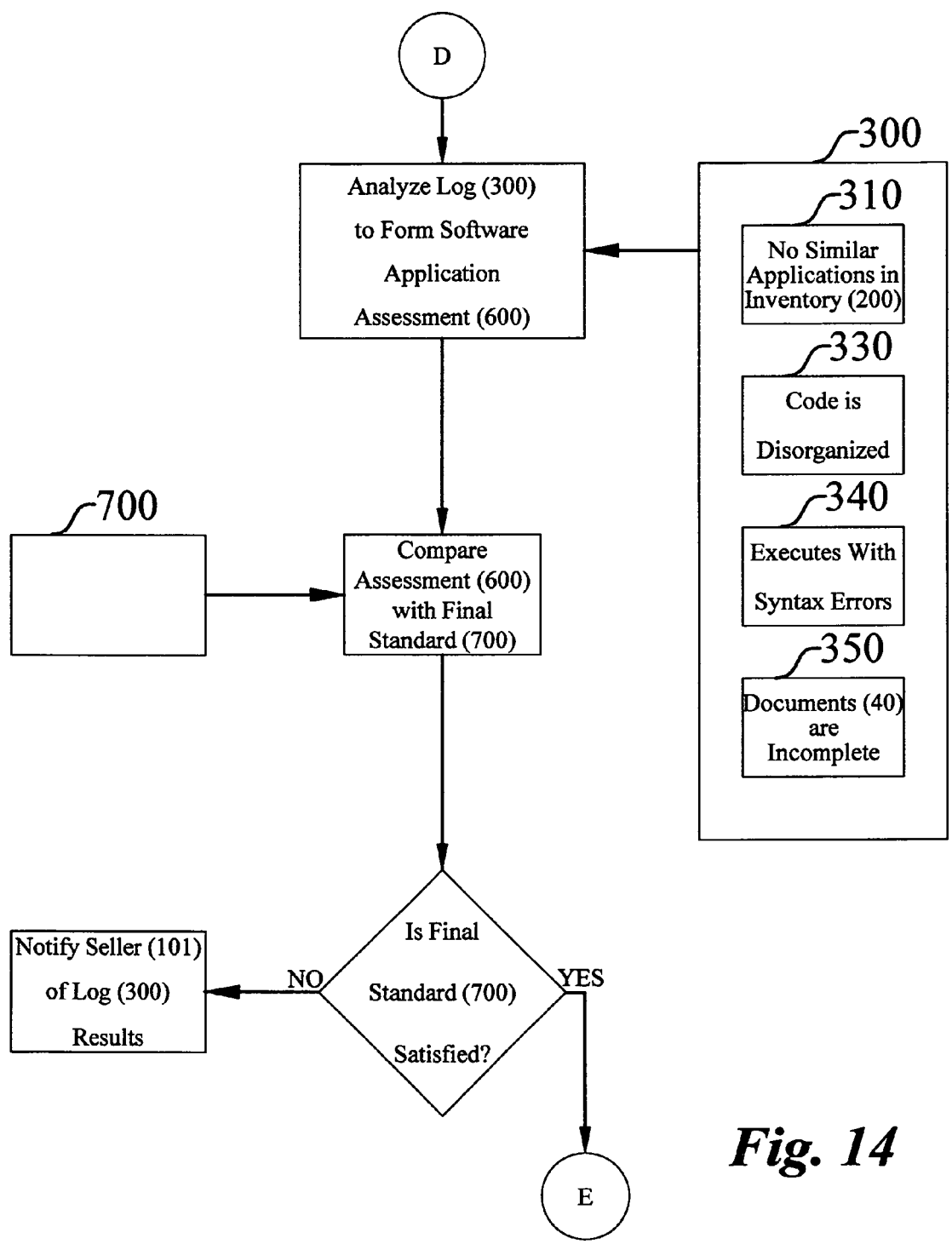
FIG. 14 is a flow chart illustrating an embodiment of the software exchange marketplace with the custom software application submission log producing a custom software application assessment for comparison with the final review standard.

Referring now to FIG. 14, in another embodiment of the instant invention, the method may include forming a means for assessing recording deficiencies, such as a custom software application assessment (600). The custom software application assessment (600) summarizes the attributes of the custom software application (20) by analyzing the custom software application submission log (300). Once the marketplace (100) forms the custom software application assessment (600), the marketplace (100) compares the custom software application assessment (600) with the final review standard (700) to determine whether the custom software application (20) satisfies the final review standard (700). The marketplace (100) may then make a decision as to whether to reject the custom software application (20) prior to the process of qualifying the custom software application (20). As one skilled in the art will observe and appreciate, the custom software application assessment (600) may simplify comparison with the final review standard (700). Moreover, rather than comparing the custom software application submission log (300), which may be a voluminous log depending on the complexity of the custom software application (20), directly with the final review standard (700), the custom software application assessment (600) may be more manageable for comparison with the final review standard (700).

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the functions in combination with other claimed elements as specifically claimed.

I claim:

1. A method for selling custom business software enabling a software seller (10) to offer a custom software application (20) having an operating system-independent platform-dependent custom software application component, having a software source code (30) and at least one software document (40), for sale to at least one prospective software buyer (50), wherein the software seller (10) submits the custom software application (20) to a software exchange marketplace (100), having a qualified software application inventory (200) searchable by the prospective software buyer (50), the method comprising the steps of:

(A) associating a custom software application submission log (300) with the custom software application (20) having an operating system-independent platform-dependent custom software application component;

(B) appraising the software source code (30) and the software documents (40) for commercial feasibility by:

(i) qualifying that the source code is a platform-dependent custom software application program;

(ii) searching the qualified software application inventory (200) for similar software applications and recording a search result (310) in the custom software application submission log (300), (iii) comparing the software source code (30) with a source code qualification standard (400), having a program organization component (410) and a program execution component (420), wherein (a) comparing the program organization component (410) with the software source code (30) identifies at least one software code deficiency (330), and (b) executing a test script (120) with the software source code (30) and comparing an execution result with the program execution component (420) identifies at least one software execution deficiency (340), whereby the software execution deficiencies (340) and the software code deficiencies (330) are recorded in the custom software application submission log (300);

(iv) comparing the software documents (40) with a document qualification standard (500) to identify at least one document deficiency (350) and recording the document deficiencies (350) in the software documents (40) in the custom software application submission log (300); and (v) comparing the custom software application submission log (300) with a final review standard (700) and determining whether the custom software application (20) satisfies the final review standard (700);

(C) qualifying the custom software application (20), when the custom software application submission log (300) satisfies the final review standard (700), by creating a qualified software application (800) having a qualified source code (810) and at least one qualified software document (820), wherein
  (i) the software source code (30) is transformed into the qualified source code (810) by correcting at least one of the software code deficiencies (330) recorded in the custom software application submission log (300) and by correcting at least one of the software execution deficiencies (340) recorded in the custom software application submission log (300), whereby when the software source code (30) satisfies the source code qualification standard (400), the software source code (30) becomes the qualified source code (810); and
  (ii) the software documents (40) are transformed into the qualified software documents (820) by correcting at least one of the document deficiencies (350) recorded in the custom software application submission log (300), whereby when the software documents (40) satisfy the document qualification standard (500), the software documents (40) become the qualified software documents (820); and
(D) listing the qualified software application (800) in the qualified software application inventory (200).

2. The method of claim 1, further including a step of rejecting the custom software application (20), prior to the step of comparing the software source code (30) with the source code qualification standard (400), when the search result (310) indicates that a similar software application is in the qualified software application inventory (200), whereby the custom software application (20) is returned to the software seller (10).

3. The method of claim 1, wherein the step of appraising the software source code (30) further including a step of importing the software source code (30) into a platform specific development system (110) and recording at least one importation result (320) with the software source code (30) in the custom software application submission log (300).

4. The method of claim 3, further including a step of rejecting the custom software application (20) when at least one importation result (320) is recorded in the custom software application submission log (300), whereby the custom software application (20) is returned to the software seller (10).

5. The method of claim 1, further including steps of forming a custom software application assessment (600) for summarizing attributes of the custom software application (20) by analyzing the custom software application submission log (300), comparing the custom software application assessment (600) with the final review standard (700) to determine whether the custom software application (20) satisfies the final review standard (700).

6. The method of claim 1, further including a step of registering the prospective software buyer (50), wherein the prospective software buyer (50) is provided with an email logon and the test script (120), whereby the prospective software buyer (50) logs into a platform specific development system (110) with the email logon and executes the test script (120) with the qualified software application (800).

7. The method of claim 1, further including associating a test case (130) with the qualified source code (810), wherein the test case (130) includes a set of variables and interacts with the qualified source code (810), whereby the prospective software buyer (50) executes the qualified software application (800) with the test case (130) to demonstrate the qualified software application (800).

8. The method of claim 1, further including a step of encrypting the qualified software application (800) thereby limiting the functionality of the qualified software application (800).

9. The method of claim 8, further including a step of transferring the qualified software application (800) to the prospective software buyer (50).

10. The method of claim 9, further including a step of piloting the qualified software application (800) on a prospective software buyer's system (52) with a prospective software buyer's test case (54), wherein the prospective software buyer's system (52) is in operative communication with the platform specific development system (110) and the prospective software buyer's test case (54) is a set of variables developed by the prospective buyer (50) to test the qualified software application (800).

11. A software exchange marketplace (100) for enabling a software seller (10) to offer a custom software application (20) having an operating system-independent platform-dependent custom software application component, having a software source code (30) that further includes a platform-dependent custom software application program and at least one software document (40), for sale to at least one prospective software buyer (50), the software exchange marketplace (100) comprising:
  (A) a platform specific development system (110) in operative communication with the software seller (10) for receiving the custom software application (20) having a platform-dependent custom software application program;
  (B) a qualified software application inventory (200) in operative communication with the prospective software buyer (50) and the platform specific development system (110);
  (C) a custom software application submission log (300) for recording deficiencies with the custom software application (20) that affect commercial feasibility of the custom software application (20), wherein the custom software application submission log (300) includes a search result (310) from a search of the qualified software application inventory (200) for similar software to the custom software application (20);
  (D) a source code qualification standard (400) having a program organization component (410), and a program execution component (420), wherein
    (i) at least one software code deficiency (330) is identified by comparing the software source code (30) with the program organization component (410) and the at least one software code deficiency (330) is recorded in the custom software application submission log (300), and
    (ii) at least one software execution deficiency (340) is identified by executing a test script (120) with the software source code (30) and comparing an execution result with the program execution component (420), and the at least one software execution deficiency (340) is recorded in the custom software application submission log (300);
  (E) a document qualification standard (500), wherein at least one document deficiency (350) is identified by and recorded in the custom software application submission log (300) by comparing the software documents (42) with the document qualification standard (500);

(F) a final review standard (700), wherein commercial value is measured by comparing the final review standard (700) with the custom software application submission log (300), whereby when the custom software application submission log (300) satisfies the final review standard (700), the custom software application (20) is accepted into the software exchange marketplace (100).

12. The software exchange marketplace (100) of claim 11, further including
  a qualified software application (800) having a qualified source code (810) and at least one qualified software document (820), wherein
    (i) the qualified source code (810) is the software source code (30) having at least one of the software code deficiencies (330) and at least one of the software execution deficiencies (340) corrected, such that the qualified source code (810) satisfies the source code qualification standard (400), and
    (ii) the qualified software documents (820) are the software documents (40) having at least one of the document deficiencies (350) corrected such that the qualified software documents (820) satisfy the document qualification standard (500), whereby the qualified software application (800) is listed in the qualified software application inventory (200).

13. The software exchange marketplace (100) of claim 12, wherein the custom software application log (300) further includes at least one importation result (320), whereby the importation results (320) are recorded in the custom software application log (300) when errors occur as the software code (30) is imported in the platform specific development system (110).

14. The software exchange marketplace (100) of claim 12, further including a custom software application assessment (600) formed by analyzing the custom software application submission log (300), whereby the custom software application assessment (600) is compared to the final review standard (700) and when the custom software application assessment (600) satisfies the final review standard (700), the custom software application (20) is accepted into the software exchange marketplace (100).

15. The software exchange marketplace (100) of claim 12, further including a test case (130) having a set of variables, wherein the test case (130) interacts with the qualified source code (810), whereby the prospective software buyer (50) executes the qualified source code (810) to demonstrate the test case (130).

16. The software exchange marketplace (100) of claim 12, wherein the platform specific development system (110) is an enterprise resource planning (ERP) system.

17. A software exchange marketplace (100) for enabling a software seller (10) to offer a custom means for computer analysis, having a means for performing computer analysis and a means for documenting computer analysis, for sale to at least one prospective software buyer (50), the software exchange marketplace (100) comprising:
  (A) a means for receiving and storing the computer analysis custom means in operative communication with the software seller (10);
  (B) a means for listing at least one qualified software application (800) in the receiving and storing means;
  (C) a means for recording deficiencies with the computer analysis custom means that affect commercial feasibility of the computer analysis custom means wherein the deficiency recording means records at least one search result (310) from a search of the listing means;
  (D) a means for standardizing software code, having a means for standardizing software code organization and a means for standardizing software code execution, wherein
    (i) the software code organization standardizing means identifies at least one software code deficiency (330) with the performing computer analysis means, whereby the at least one software code deficiency (330) is recorded in the deficiency recording means;
    (ii) the software code execution means identifies at least one software execution deficiency (340) with the performing computer analysis means, whereby the at least one software execution deficiency (340) is recorded in the deficiency recording means;
  (E) a means for standardizing software documents that identifies at least one document deficiency (350) with the documenting computer analysis means, whereby the at least one document deficiency (350) is recorded by the deficiency recording means; and
  (F) a means for identifying commercially valuable custom software applications having an operating system-independent platform-dependent custom software application component that is compared with the deficiency recording means, whereby when the deficiency recording means satisfies the identifying commercially valuable custom software application means, the computer analysis custom means is accepted into the software exchange marketplace (100).

18. The software exchange marketplace (100) of claim 17, further including a qualified means for computer analysis, having a qualified means for performing computer analysis and a qualified means for documenting computer analysis, wherein
  (i) the performing computer analysis qualified means is the performing computer analysis means having at least one of the software code deficiencies (330) and at least one of the software execution deficiencies (340) corrected, such that the performing computer analysis qualified means satisfies the standardizing software code means, and
  (ii) the documenting computer analysis qualified means is the documenting computer analysis means having at least one of the document deficiencies (350) in the recording deficiency means corrected such that the documenting computer analysis qualified means satisfies the standardizing software documents means, whereby the computer analysis qualified means is placed in the receiving and storing means.

19. The software exchange marketplace (100) of claim 17, wherein the recording deficiency means further includes at least one importation result (320), whereby the at least one importation result (320) is recorded in the recording deficiency means when errors occur as the performing computer analysis means is imported into the receiving and storing means.

20. The software exchange marketplace (100) of claim 17, further including a means for assessing recording deficiencies by analyzing the deficiency recording means, whereby assessing recording deficiency means is compared to the identifying commercial valuable custom software application means, and when the assessing recording deficiency means satisfies the identifying commercial valuable custom software application means, the computer analysis custom means is accepted into the software exchange marketplace (100).

21. The software exchange marketplace (100) of claim 17, wherein the standardizing software code execution means further includes a test script (120), whereby the performing computer analysis means is executed with the test script (120) such that an execution result is compared with the standardizing software code execution means to identify the at least one software execution deficiency (340) in the deficiency recording means.

22. The software exchange marketplace (100) of claim 18, further including a means for buyer testing for testing the selling custom software means, wherein the buyer testing means includes a means for testing computer analysis, whereby the prospective software buyer (50) tests the selling custom software means on the buyer testing means by executing the qualifying code means with the testing computer analysis means.

\* \* \* \* \*